INVENTOR
THEODORE F. CARLIN
BY Kwis, Hudson & Kent
ATTORNEYS

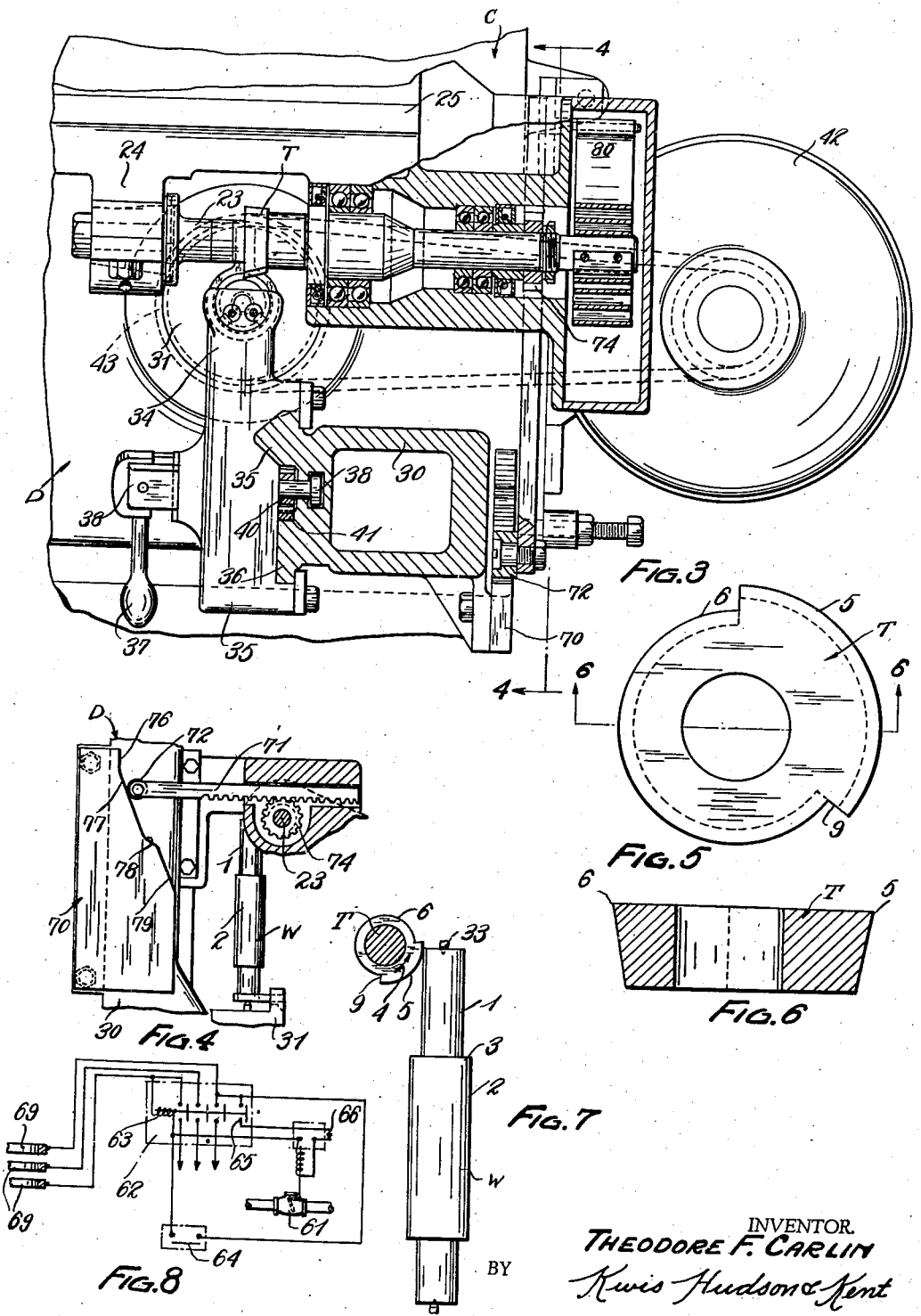

Patented Mar. 4, 1941

2,233,398

UNITED STATES PATENT OFFICE 2,233,398

TURNING MACHINE

Theodore F. Carlin, Cleveland, Ohio, assignor to The Cleveland Hobbing Machine Company, Cleveland, Ohio, a corporation of Ohio Application November 28, 1938, Serial No. 242,703

10 Claims. (Cl. 82—3)

The present invention relates to a method and machine for working metal, plastics, wood and the like.

An object of the present invention is the provision of a novel, simple, and reliable method of working metal, plastics, wood, and the like, which is much faster and more accurate than methods heretofore known.

Another object of the present invention is the provision of a novel method of working metal, plastics, wood, etc., wherein a blank is rotated in cutting relation with a disk-like face-type cutter rotated slowly about an axis normal to the axis of rotation of the work and offset therefrom while a relative feed movement is effected between the blank and cutter longitudinally of the axis of rotation of the blank.

Another object of the present invention is the provision of a novel machine for working metal, plastics, wood, and the like, which will produce a desired article quickly and accurately and which employs a cutter or cutters that have long life and can be readily sharpened.

Another object of the present invention is the provision of a novel, inexpensive, rugged machine for working metal, plastics, wood, etc., comprising means for rotatably supporting a blank in cutting relation with a disk-like face-type cutter rotated about an axis normal to the axis of rotation of the blank, while effecting a relative feed movement between the blank and cutter longitudinally of the axis of rotation of the blank.

Another object of the present invention is the provision of a novel cutter comprising a disk-like body having stepped cutting edges adjacent to the periphery of one face thereof.

Further objects and advantages of the present invention will be apparent to those skilled in the art to which the invention relates from the following description of the preferred embodiment thereof described with reference to the accompanying drawings, in which similar reference characters designate corresponding parts throughout the several views, and in which:

Fig. 3 is a plan view approximately on the line 3—3 of Fig. 2;

Fig. 4 is a view approximately on the line 4—4, Fig. 3;

Fig. 5 is a plan view of the tool shown in the preceding figures;

Fig. 6 is a section on the line 6—6 of Fig. 5;

Fig. 7 is a view of the tool and a work blank formed thereby; and

Fig. 8 is a wiring diagram of the electric circuit for one unit.

Figure 1:
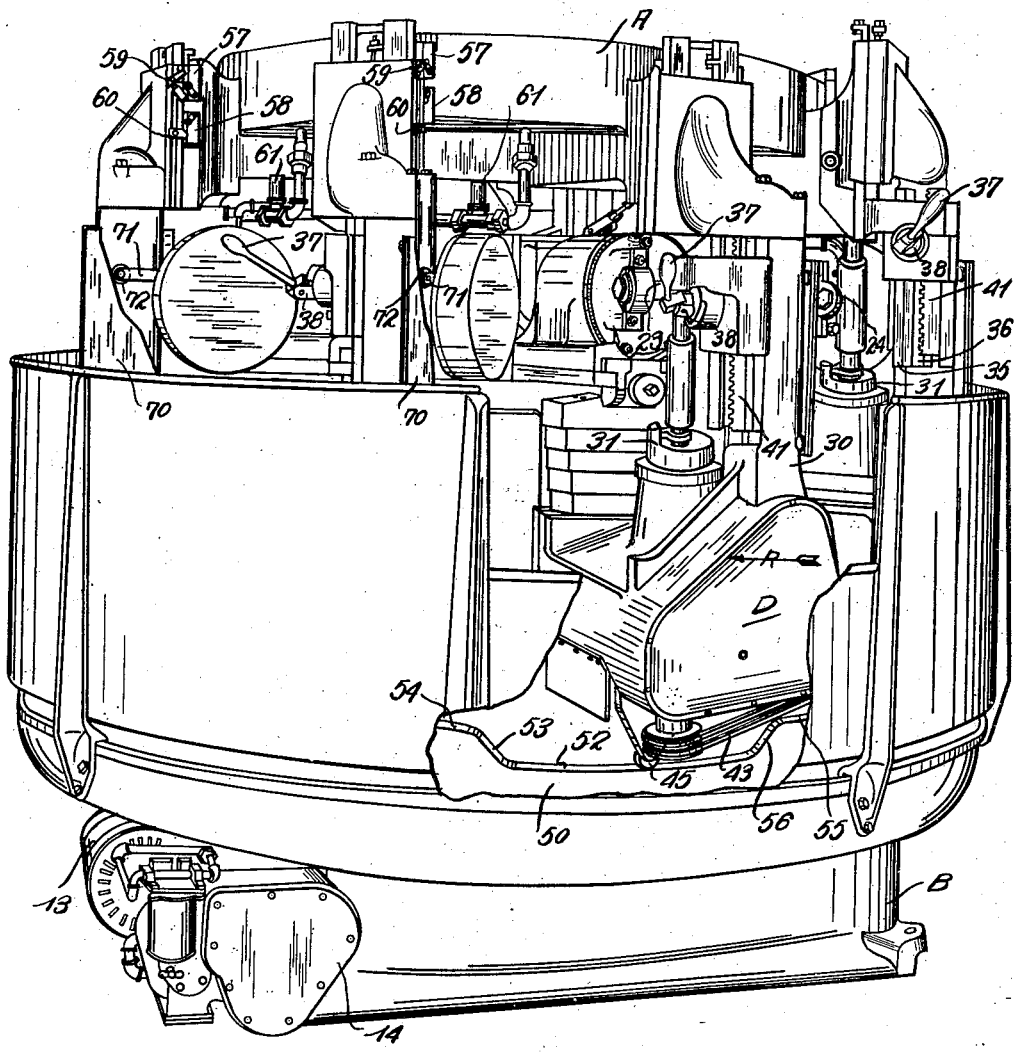
Fig. 1 is a perspective view of a multiple spindle, rotatable turret-type metal working machine embodying the present invention.

Generally speaking the method of the present invention comprises rotating a blank in cutting relation with a face-type, disk-like tool rotated slowly and/or intermittently about an axis normal to the axis of rotation of the blank and offset therefrom, while producing a relative feed movement between the blank and tool in a direction longitudinally of the axis of rotation of the blank. Portions of different diameter on the blank are formed by locating the cutting edges of the tool which form these particular portions at various distances radially from the axis of rotation of the tool. For example, the blank W (see Fig. 7) having portions 1 and 2 of appreciable length and of different diameters connected by an abrupt right angled shoulder 3 is formed by a tool T by rotating the blank in cutting relation with the cutter while slowly rotating the cutter in the direction of the arrow 4 about an axis normal to the axis of rotation of the blank and offset therefrom, and while effecting a relative feed movement between the blank W and the tool T in a direction parallel to the axis of rotation of the blank.

The portion 1 of the blank W, which is the portion of smaller diameter, is formed by the circular cutting edge 5 of the tool T and the portion 2 of larger diameter is formed by the circular cutting edge 6. The circular cutting edge 5 is spaced radially of the axis of rotation of the tool T from the circular cutting edge 6 a distance equal to the difference in diameter between the portions 1 and 2 of the blank W. The abrupt shoulder 3 of the blank W is formed by the cutting edge 9 of the tool T which extends radially of the cutter. While the shoulder 3 is being cut or formed, the tool T is rotated so that with respect to the blank it is rolling along the smaller diameter without slip. At either side of the shoulder 3, the tool may be rolled along the blank with or without slip. While it will be apparent that there is a definite relation between the speed of rotation of the tool and the feed rate, it is not necessary that this relation remain uniform throughout the cutting operation. By slowing down the rotation of the tool while cutting portions of uniform diameter, the size of the tool can be reduced.

Figure 2:
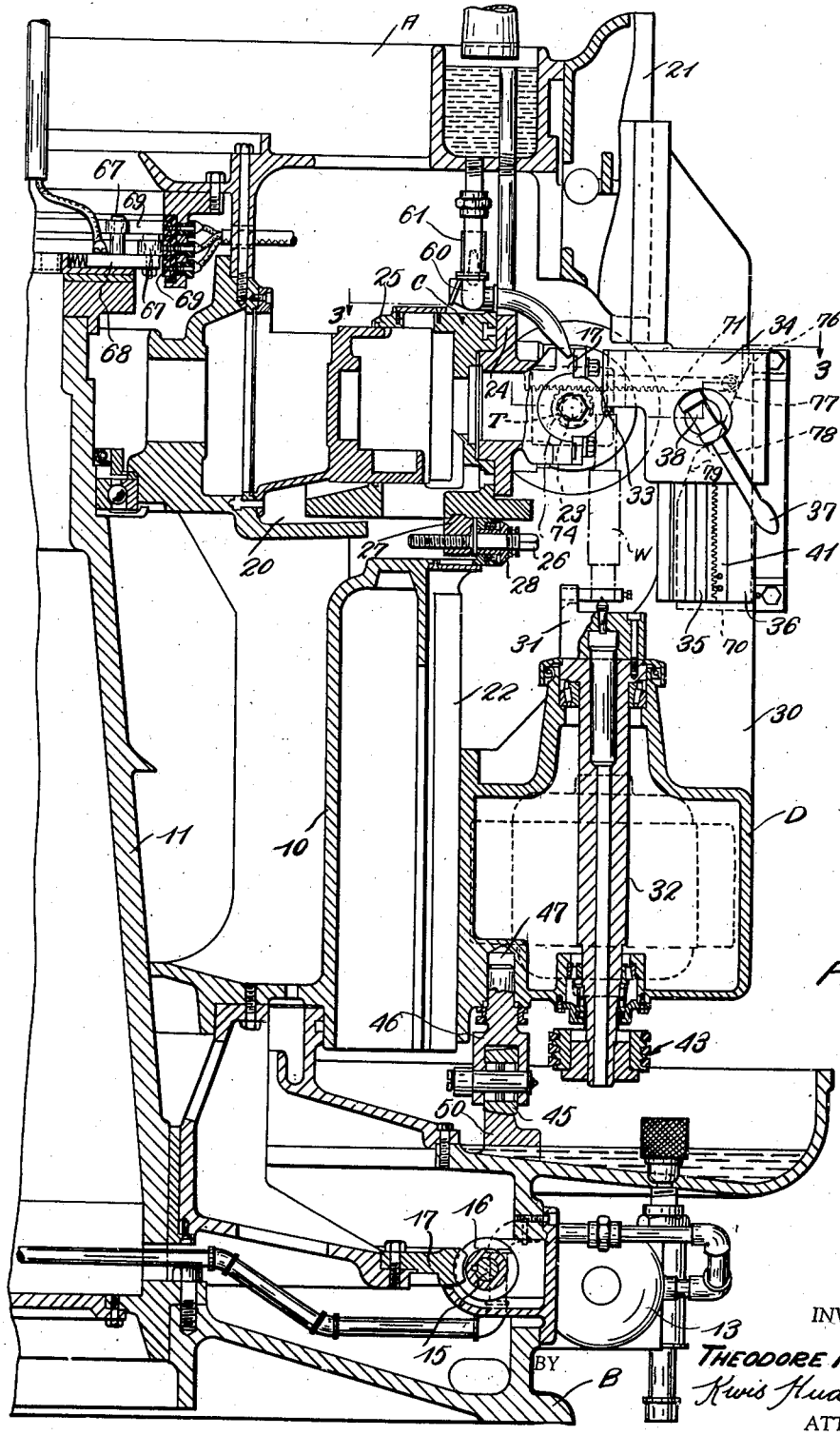
Fig. 2 is a vertical section through one of the spindles of the machine shown in Fig. 1.

Referring to Figs. 1 to 6 of the drawings, the reference character A designates a turret proper including a frame designated generally by the reference character 10 constructed of different members bolted or otherwise suitably secured together. The turret A is rotatably supported on a central column 11 carried by a base designated generally by the reference character B, which base also serves as a sump for the cutting fluid, etc. The turret A is continuously rotated about the column 11 in the direction indicated by the arrow R by a motor 13 carried by the base B and operatively connected to the turret A through a gear reduction 14, the driven shaft 15 of which has a worm 16 thereon continuously in mesh with a large worm wheel 17 bolted to the lower part of the turret frame 10.

The turret A comprises eight metal working units, only one of which will be described in detail since the units are all identical. Each of the metal working units includes a tool head designated generally by the reference character C slidably supported on horizontal ways 20 for movement radially of the axis of rotation of the turret A. The ways 20 are formed integral with a portion of the turret frame 10 and are located intermediate vertically spaced vertical ways 21 and 22 upon which the work head D, hereinafter more specifically referred to, is slidably supported for vertical movement. The tool T is carried by a tool spindle 23 rotatably supported in a member 24, which member is in turn carried by a member 25 and adjustable relative thereto about a horizontal axis. The member 25 is slidably supported on the horizontal ways 20 and is adjustable therealong by a screw 26 rotatably supported in the turret frame 10 and having threaded engagement with a block 27 fixed to the underside of the member 25. A graduated dial 28 fixed to the screw 26 facilitates adjustment of the tool head. After the tool head C has been adjusted to the desired position, it is clamped to the ways 20 in a conventional manner.

The work head D comprises a frame member 30 slidably supported on the vertically spaced vertical ways 21 and 22 heretofore referred to, formed integral with the turret frame 10 adjacent to the upper and lower ends thereof, respectively. The work W is adapted to be supported between a chuck 31 fixed to the upper end of the work spindle 32 and a tail center 33 of a tail stock 34 slidably supported on vertical ways 35 and 36 formed integral with the work head frame 30. The tail stock 34 is adapted to be moved vertically along the ways 35 and 36 and clamped in any position therealong by a manually operable lever 37 pivotally connected to the outer end of a member 38 rotatably supported in the tail stock 34. The inner end of the member 38 is provided with a gear 40 which is continuously in mesh with a rack 41 secured to the work head frame 30 adjacent to the outer way 36. The lever 37 is rotatable about an axis parallel with the way 36 to clamp and unclamp the tail stock, and rotatable about an axis normal to the way 36 to move the tail stock vertically.

The work spindle 32 is rotatably supported in the work head frame 30 in a suitable manner and is driven from a motor 42 bolted to the right-hand side of the work head frame 30. The motor 42 is connected with the lower end of the spindle 32 through the medium of a V-belt drive 43.

The work heads D are each provided with a roller 45 suitably secured in the lower ends of members 46, the upper ends of which members are cylindrical and engage within apertures 47 formed in the undersides of the work head frames 30. The rollers 45 engage a large circular cam 50 suitably secured to the base B and as the turret rotates about the column 11, the work heads D are caused to move up and down, due to the contour of the cam 50.

As the turret A is rotated about the central column 11, the various working units are successively moved through a loading station, at which point the finished work is removed and a new blank inserted in place thereof. The new blank is positioned between the chuck 31 and the tail center 33 while the roller 45 of the particular work head being loaded is traveling along the low surface 52 of the cam 50. As the work head leaves the loading station, the roller 45 travels up the quick rise incline 53 of the cam, which brings the blank up to the tool. Thereafter the roller travels along the portion 54 of the cam which is of uniform rise and which gradually feeds the work up past the tool. By the time the work head again approaches the loading station, the work W has been carried vertically upward past tool T and the desired operations performed thereon. As one of the work heads enters the loading station, the roller 45 thereof travels along a surface 55 of uniform height, during which time the finished work is removed. After the finished work has been removed, the roller 45 travels down the incline 56, returning the work head to its lower or loading position.

As the work heads leave the loading station, the motors 42 thereof are automatically started and the cutting fluid automatically turned on, and as the work heads enter the loading station, the motors are automatically stopped and the cutting fluid shut off. This is accomplished electrically through the medium of a plurality of limit switches 57 and 58 secured to the turret and controlled by stops or cams 59 and 60 fixed to the work head. The coolant fluid is controlled by a solenoid-operated valve 61 connected in the control circuit in a manner hereinafter described.

The electrical circuit for each unit of the machine is the same and is as shown in Fig. 8. The supply of current to the motor 42 is controlled by a contactor panel 62, the operating solenoid 63 of which is connected in series with a normally open switch 64 adapted to be momentarily closed by the pivoted cam or stop 59 just prior to engagement of the work by the tool. The closing of this switch 64 energizes the operating solenoid 63 which in turn starts the motor. Upon the closing of the contacts which connect the motor to the line, a holding circuit is established for the solenoid 63 through normally open contacts 65 which operate simultaneously with the operation of the main contacts. The closing of this holding circuit also opens the solenoid valve 61, the operating coil of which is connected in series therewith. As the work head reaches its upper limit of travel, the motor is stopped and the solenoid valve permitted to close upon the opening of the normally closed limit switch 66 in series with the holding circuit referred to by the engagement therewith of the stop or cam 60. The electric current for the motors 42, etc., is transmitted to the turret A by means of rollers 67 carried by members 68 slidably supported in a member secured to the upper end of the column 11. The rollers 67 engage insulated collector rings 69 carried by the column 11. The means of transmitting the electrical current to the turret A forms no part of the present invention and any well-know method can be employed.

In the embodiment of the invention shown, the tool T is rotated in relation to the feed movement by a cam 70 fixed to the work head D, which cam actuates a slidable rod 71 through the medium of a roller 72 carried by the rod and engaging the cam. The rear end of the rod 71 has rack teeth formed thereon which are continuously in mesh with a gear 74 keyed to the right-hand end of the cutter spindle 23. As the work head moves in an upward direction during the cutting operation, the cam 70 moves the slidable member 71 radially inwardly, thus rotating the tool T in a counterclockwise direction, as viewed in Fig. 2. The upper portion 76 of the cam 70, which corresponds with the movement of the head from its lower position to the position immediately prior to the engagement of the tool with the work, produces no movement of the member 71.

As the portion 5 of the tool T which forms the upper end of the blank or work W travels along the work blank, the tool is slowly rotated as the roller 72 travels along a portion 77 of the cam 70. The portion 77 of the cam 70 is of uniform rise but the inclination thereof is less than that which would be required to rotate the tool along the blank without slip. As the tool approaches the shoulder 3 on the blank, the roller 72 engages the inclined surface 78 on the cam 70. The incline of the surface 78 is such that during the formation of the shoulder 3, the tool is rotated at such a speed that in effect it is rolling on the smaller diameter of the blank without slip. After the shoulder 3 is completed, the rate of rotation of the tool is decreased as the portion 2 of larger diameter of the blank is being formed. During the formation of this portion of the blank, the roller 72 travels along the incline 79 on the cam 70.

The size of the tool is maintained within practical limits by causing it to rotate while forming portions of uniform diameter at a speed less than that which would be required to cause the tool in effect to roll along the blank without slip. Taking this into consideration, it will be apparent that the inclination of the cam surfaces at either side of the surface which the roller engages during the forming of a shoulder may be varied as desired. However, the inclination of the surface engaged by the roller during the formation of a shoulder is preferably such that the tool is caused to rotate as though it were rolling without slip on the smaller diameter of the two diameters which form the shoulder. It will also be apparent that the inclination of the cutting edge 9 which forms the shoulder 3 may be varied and the rotation of the tool so selected that the desired shoulder is generated on the work.

The roller 72 is constantly maintained in engagement with the cam 70 by a heavy coil spring 80, one end of which is connected to the tool spindle 23 while the other end thereof is connected to the member 24. The tool T, as previously stated, is of disk-type having stepped cutting edges adjacent to the periphery of one face thereof. The cutting edges are provided with the usual rake and the construction of the tool is such that it may be readily sharpened by grinding the upper face thereof. Sharpening the tool does not change the relative radial distances between the cutting edges.

From the foregoing description of the preferred embodiment of the invention, it will be apparent that the objects heretofore enumerated have been accomplished and that a novel machine, method and cutter for working metal, plastics, wood, etc., have been provided. While the preferred embodiment of the invention has been described with considerable detail, I do not wish to be limited to the particular construction shown, which may be varied within the scope of this invention. The invention is particularly applicable to multiple spindle machines of the rotary turret type and for that purpose is illustrated herein and described as embodied in such a machine. However, it is to be understood that the invention is nevertheless applicable to single spindle machines.

While the invention has been described with reference to a work blank of particular configuration, it will be readily apparent that any desired form may be produced by the present invention by using a cutter of suitable design. It will also be apparent that the work blank may be operated upon simultaneously by two or more cutters if desired. For example, a roughing cutter might be followed by a finishing cutter, or separate cutters may be employed to form different portions of the work. It is my intention to cover hereby all adaptations, modifications, and uses of the present invention that come within the practice of those skilled in the art to which the invention relates and I particularly point out and claim as my invention the following:

1. A cutter of the character described comprising a frusto-conical body portion having a flat face and a plurality of radially offset cutting edges along the periphery of said face, a plurality of said cutting edges being of substantial length circumferentially of the tool.

2. In a machine of the character described, the combination of a frame, a work spindle rotatably supported in said frame, a tool spindle rotatably supported in said frame with its axis of rotation substantially at right angles to the axis of rotation of said work spindle and offset therefrom, means for rotating said work spindle, means for producing a relative feed movement between said work spindle and tool spindle in a direction parallel to the axis of rotation of the work spindle, and means including a non-uniform cam for rotating said tool spindle at a non-uniform rate but in predetermined relation to the feed movement.

3. A machine of the character described comprising a frame provided with a plurality of vertically spaced vertical guideways and a horizontal guideway therebetween, a tool head supported on said horizontal guideways, a substantially horizontal tool spindle rotatably supported in said tool head, a work head slidably supported on said vertically spaced guideways and comprising a column spanning the space between the said vertical guideways, a substantially vertical work spindle rotatably supported in said work head, means for moving said work head vertically, means for rotating said work spindle, and means for rotating the tool spindle at a non-uniform rate during the cutting operation but in predetermined relation to the feed movement.

4. In a machine of the character described, the combination of a base, a turret rotatably supported by said base, means for rotating said turret, a plurality of tool spindle supported by said turret for rotation about a substantially horizontal axis, a plurality of work spindles supported by said turret for rotation about a substantially vertical axis, means for producing a relative feed movement between said tool and work spindles, means for rotating said work spindles, and means for rotating said tool spindles at different speeds during the cutting operation but in predetermined relation to the feed movements.

5. In a machine of the character described, the combination of a frame, a work head slidably carried by said frame, a work spindle rotatably supported in said work head, a tool spindle rotatably supported in said frame with its axis of rotation normal to the axis of rotation of said work spindle and offset therefrom, means for rotating said work spindle, means for moving said work head to produce a relative feed movement between said work spindle and said tool spindle in a direction parallel to the axis of rotation of the work spindle, and means for rotating said tool spindle at a non-uniform rate during the cutting operation.

6. In a machine of the character described, the combination of a frame, a work head slidably carried by said frame, a work spindle rotatably supported in said work head, a tool spindle rotatably supported in said frame with its axis of rotation normal to the axis of rotation of said work spindle and offset therefrom, means for rotating said work spindle, means for moving said work head to produce a relative feed movement between said work spindle and said tool spindle in a direction parallel to the axis of rotation of the work spindle, and means including a non-uniform cam carried by said work head for rotating said tool spindle at a non-uniform rate during the cutting operation.

7. In a machine of the character described, the combination of a frame, a work head slidably carried by said frame, a work spindle rotatably supported in said work head, a tool spindle rotatably supported in said frame with its axis of rotation normal to the axis of rotation of said work spindle and offset therefrom, means for rotating said work spindle, means for moving said work head to produce a relative feed movement between said work spindle and said tool spindle in a direction parallel to the axis of rotation of the work spindle, a gear operatively connected to said tool spindle, a rack slidably carried by said frame and in mesh with said gear, a cam carried by said work head, and means for operatively connecting said rack and said cam.

8. In a machine of the character described, the combination of a frame, a work head slidably carried by said frame, a work spindle rotatably supported in said work head, a tool spindle rotatably supported in said frame with its axis of rotation normal to the axis of rotation of said work spindle and offset therefrom, means for rotating said work spindle, means for moving said work head to produce a relative feed movement between said work spindle and said tool spindle in a direction parallel to the axis of rotation of the work spindle, a gear operatively connected to said tool spindle, a rack slidably carried by said frame and in mesh with said gear, a non-uniform cam carried by said work head, and means operatively connecting said rack and said cam for rotating said tool spindle upon movement of said work head.

9. In a machine of the character described, the combination of a frame, a work head slidably carried by said frame, a work spindle rotatably supported in said work head, a tool spindle rotatably supported in said frame with its axis of rotation normal to the axis of rotation of said work spindle and offset therefrom, means for rotating said work spindle, means for moving said work head to produce a relative feed movement between said work spindle and said tool spindle in a direction parallel to the axis of rotation of the work spindle, a gear operatively connected to said tool spindle, a rack slidably carried by said frame and in mesh with said gear, a stationary non-uniform cam carried by said work head, and means operatively connecting said rack and said cam for rotating said tool spindle upon movement of said work head and in timed relation to the movement of the latter.

10. In a machine of the character described, the combination of a base, a turret rotatably supported by said base, means for rotating said turret, a tool spindle carried by said turret and rotatable about a substantially horizontal axis, a work spindle carried by said turret and rotated about a substantially vertical axis, means for producing a relative feed movement between said spindles in a direction parallel to the axis of rotation of the work spindle, means for rotating said work spindle, and means for rotating said tool spindle at a non-uniform rate during the cutting operation.

THEODORE F. CARLIN.